US00RE45858E

(19) United States
(12) Reissued Patent
Epstein et al.

(10) Patent Number: US RE45,858 E
(45) Date of Reissued Patent: Jan. 19, 2016

(54) SYSTEM AND METHOD FOR MODIFYING INTERNET TRAFFIC AND CONTROLLING SEARCH RESPONSES

(71) Applicant: WifiFee, LLC, Menands, NY (US)

(72) Inventors: Brian D. Epstein, Delmar, NY (US); Bruce Hodge, Greenfield, NY (US)

(73) Assignee: WifiFee, LLC, Menands, NY (US)

(21) Appl. No.: 14/172,304

(22) Filed: Feb. 4, 2014

Related U.S. Patent Documents

Reissue of:

(64) Patent No.: 8,112,435
Issued: Feb. 7, 2012
Appl. No.: 12/057,602
Filed: Mar. 28, 2008

U.S. Applications:

(60) Provisional application No. 60/914,337, filed on Apr. 27, 2007.

(51) Int. Cl.
*G06F 17/30* (2006.01)
*G06Q 30/02* (2012.01)

(52) U.S. Cl.
CPC ..... *G06Q 30/02* (2013.01); *G06Q 30/0256* (2013.01)

(58) Field of Classification Search
CPC ..... G06F 17/30
USPC ..... 707/769
See application file for complete search history.

(56) References Cited

U.S. PATENT DOCUMENTS 6,006,225 A * 12/1999 Bowman et al.
6,438,125 B1 8/2002 Brothers
6,487,538 B1 11/2002 Gupta et al.
6,654,725 B1 11/2003 Langheinrich et al.
6,676,014 B2 1/2004 Catan
7,010,534 B2 3/2006 Kraft
7,051,351 B2 5/2006 Goldman et al.
7,089,194 B1 8/2006 Berstis et al.
7,092,493 B2 8/2006 Hou et al.
7,152,061 B2 12/2006 Curtis et al.
7,225,182 B2 * 5/2007 Paine et al. ..... 707/709
7,792,967 B2 * 9/2010 Jones et al. ..... 709/226
2002/0021665 A1 * 2/2002 Bhagavath et al. ..... 370/229
2003/0023973 A1 1/2003 Monson et al.
2003/0135500 A1 * 7/2003 Chevrel et al. ..... 707/9
2004/0088355 A1 5/2004 Hagan et al.

(Continued)

OTHER PUBLICATIONS

U.S. Appl. No. 12/057,602, Office Action, Jul. 12, 2010, 17 pages.

(Continued)

*Primary Examiner* — Matthew Heneghan

(74) *Attorney, Agent, or Firm* — Michael F. Hoffman; Hoffman Warnick LLC

(57) ABSTRACT

A system, method and program product for modifying data packets being communicated between a client and a Web application to enhance the Web experience of a user. A system is disclosed for enhancing searches being performed by a search engine application, and monitoring data packets passing through a network node to identify a data packet containing an original search query; modifying the data packet containing the original search query to create a modified search query; and forwarding the modified search query to the search engine application in place of the original search query.

23 Claims, 2 Drawing Sheets

(56) References Cited

U.S. PATENT DOCUMENTS

| | | | | |
|---|---|---|---|---|
| 2004/0098311 | A1 | 5/2004 | Nair et al. | |
| 2004/0162765 | A1 | 8/2004 | Reber | |
| 2004/0199419 | A1* | 10/2004 | Kim et al. | 705/14 |
| 2005/0060417 | A1* | 3/2005 | Rose | 709/228 |
| 2005/0131741 | A1 | 6/2005 | Tang et al. | |
| 2005/0144073 | A1 | 6/2005 | Morrisroe et al. | |
| 2005/0165615 | A1 | 7/2005 | Minar | |
| 2005/0203766 | A1 | 9/2005 | Donaldson | |
| 2005/0240472 | A1 | 10/2005 | Postrel | |
| 2005/0256766 | A1 | 11/2005 | Garcia et al. | |
| 2005/0289113 | A1* | 12/2005 | Bookstaff | 707/1 |
| 2006/0026013 | A1 | 2/2006 | Kraft | |
| 2006/0064411 | A1* | 3/2006 | Gross et al. | 707/3 |
| 2006/0100956 | A1 | 5/2006 | Ryan et al. | |
| 2006/0174327 | A1 | 8/2006 | Song et al. | |
| 2006/0206380 | A1 | 9/2006 | Joo | |
| 2006/0206474 | A1* | 9/2006 | Kapur et al. | 707/5 |
| 2006/0282319 | A1 | 12/2006 | Maggio | |
| 2006/0293959 | A1 | 12/2006 | Hogan | |
| 2007/0038511 | A1 | 2/2007 | Hytken | |
| 2007/0136295 | A1* | 6/2007 | Gorodyansky et al. | 707/10 |
| 2007/0192860 | A1* | 8/2007 | Hiscock | 726/23 |
| 2007/0208706 | A1* | 9/2007 | Madhavan et al. | 707/3 |
| 2008/0140806 | A1* | 6/2008 | Kumar | 709/219 |

OTHER PUBLICATIONS

U.S. Appl. No. 12/057,602, Final Office Action, Dec. 30, 2010, 12 pages.

U.S. Appl. No. 12/057,602, Notice of Allowance & Fees Due, Nov. 9, 2011, 12 pages.

Haas et al., "The Performance of Query Control Schemes for the Zone Routing Protocol", IEEE/ACM Transactions on Networking, vol. 9, No. 4, Aug. 2001, pp. 427-438.

U.S. Appl. No. 12/057,602, Notice of Allowance & Fees Due, Dec. 14, 2011, 12 pages.

* cited by examiner

SYSTEM AND METHOD FOR MODIFYING INTERNET TRAFFIC AND CONTROLLING SEARCH RESPONSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority to provisional application entitled "SYSTEM AND METHOD FOR MODIFYING INTERNET TRAFFIC AND CONTROLLING SEARCH RESPONSES," filed on Apr. 27, 2007, Ser. No. 60/914,337, the contents of which is hereby incorporated by reference.

FIELD OF THE INVENTION

The present invention relates generally to computer network transmissions, and more particularly to a system and method for modifying internet traffic and controlling search responses.

BACKGROUND OF THE INVENTION

Currently, advertising remains a primary means for deriving revenue for websites and other web-based applications. However, the entire web-based advertising revenue model favors a very small number of sites that are positioned to drive users to their sites. For example, general purpose search engine websites, such as GOOGLE, YAHOO, ASK.COM, etc., have a distinct economic advantage since there are only a handful of such sites that provide an indispensable service to all Web users. Such sites can further harness their economic position by controlling search results. For example, search sites can control search results based on who pays to have their listing placed higher in the rankings. Thus, content is often skewed towards what the advertisers want, as opposed to what to users want.

This model unfortunately provides little opportunity for the users themselves (who are the ones actually visiting the sites where the advertising occurs) and other third party providers (who facilitate the process) to economically benefit. For instance, a service that provides wireless Web access, e.g., at an airport, hotel, etc., is not able to participate in the advertising revenue model in an effective manner even though they are providing the gateway for countless users to access popular websites. Even if the wireless service implements a portal page that is displayed after a login or connection, a typical user will quickly navigate to other websites of interest. Thus, the advertising revenue is limited for such a service.

Accordingly, a need exists for an improved infrastructure for sharing advertising revenue in which revenue can be shared with the third party providers who facilitate the networking process and the users who drive the process.

SUMMARY OF THE INVENTION

A system, method and program product are provided for modifying data packets being communicated between a client and a Web application to enhance the Web experience of a user. In a first aspect there is a system for enhancing searches being performed by a search engine application, comprising:

a system for monitoring data packets passing through a network node to identify a data packet containing an original search query; a system for modifying the data packet containing the original search query to create a modified search query; and a system for forwarding the modified search query to the search engine application in place of the original search query.

In a second aspect there is a method for enhancing searches being performed by a search engine application, comprising: monitoring data packets passing through a network node to identify a data packet containing an original search query; modifying the data packet containing the original search query to create a modified search query; and forwarding the modified search query to the search engine application in place of the original search query.

In a third aspect there is a program product stored on a computer readable medium, which when executed, causes a computer system to enhance a result of a web application, the program product comprising: program code for monitoring data packets passing through a network node to identify an original data packet; program code for modifying the original data packet to create a modified data packet; and program code for outputting the modified data packet to effectuate an enhanced result from the web application.

The described solution enables a networking apparatus (i.e., network node) to be modified with code or specialized hardware to provide the ability to modify Internet traffic as the traffic passes through the Apparatus based on embedded or remote shaping logic received from a centralized computing system or server. This technology can thus be used to, e.g., provide shaped Internet searches and web site browsing based on heuristics, keywords, geographic and/or demographic data obtained from the shaping logic.

An illustrative network node may include, e.g., a router, a firewall, a proxy server, a cache server, DHCP Server, DNS Server, a Hot Spot Gateway, a switch, a hub, a wireless access point, a cell tower, a computer, a Web TV box, a cable box, a gaming machine, a PDA, a digital TV, a cell phone, etc. Illustrative technologies for implementing the features of the disclosure may include the use of: routing, packet switching, uniform resource locators (URLs), uniform resource indexes (URIs), Internet protocol (ip) addresses, ad sense application, web searching, DHCP, search queries, cookies, and web browsing.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Figure 1:
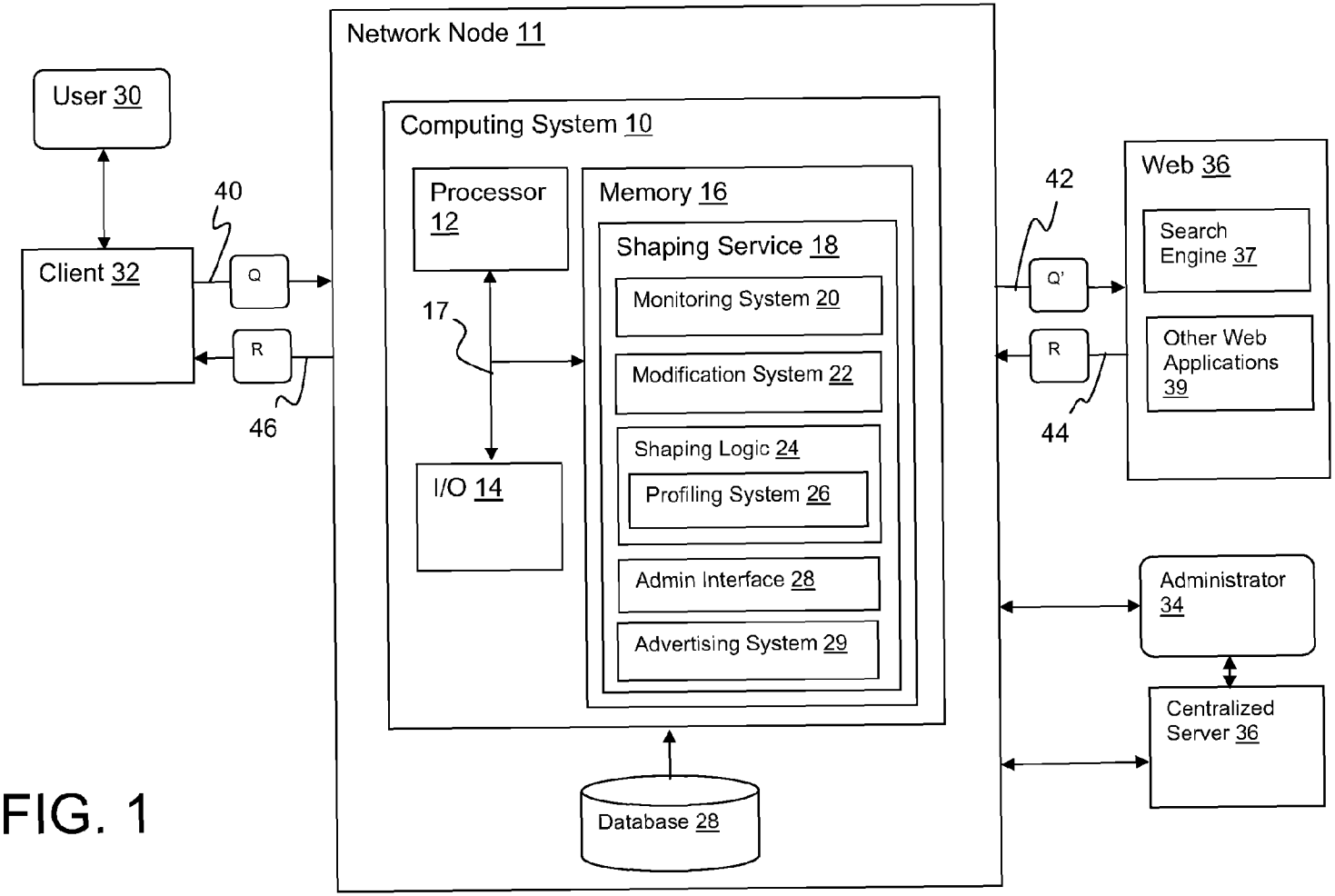
FIG. 1 depicts a networking environment having a shaping service in accordance with an embodiment of the present invention.

Referring to drawings, FIG. 1 depicts a network node 11 that includes a computing system 10 for implementing a shaping service 18. Network node 11 may include any type of node that sits between a client 32 and the Web 36. Examples include, e.g., routers, firewalls, servers, proxy servers, etc. Shaping service 18 generally includes: (1) a monitoring system 20 for monitoring data packets being communicated between the client 32 and the Web 36; (2) a modification system 22 for selectively modifying data packets; (3) shaping logic 24 that provides the logic for determining what data packets should be modified and how the data packets should be modified (e.g., based on a profiling system 26); (4) an administrative interface 28 that allows an administrator to, among other things, configure the shaping logic 24; and (5) an advertising system 29 that allows advertisers to influence data packet modifications.

In one illustrative embodiment, a user 30 interfaces with a client 32 (e.g., a browser running on a laptop with a wireless card). The client 32 connects to the Web 36 via a wireless router (i.e., network node 11). The wireless router may for instance be implemented by a service provider to provide web access at, e.g., an airport, a hotel, an apartment building, etc. During normal operations, data packets pass from client 32 to the network node 11 via a first transmission link 40, from the network node 11 to the Web 36 via a second transmission link 42, from the Web 36 back to the network node 11 via a third transmission link 44, and from the network node 11 back to the client 32 via a fourth transmission link 48. (Although not shown, it is understood that various other network nodes may reside along these paths.) Shaping service 18 effectively monitors the data packets flowing between the client 32 and the Web 36 and selectively modifies data packets to enhance or otherwise alter the Web experience of user 30.

For instance, assume user 30 has pointed their browser to a Web search engine 37, and submits a query Q. Shaping service 18 would examine the transmitted data packet using monitoring system 20, and determine, based on shaping logic 24, whether the data packet containing the query Q should be modified. For instance, assume the user 30 is wirelessly connected to network node 11 from a hotel in Des Moines, Iowa that provides a free wireless service option to its guests. If the user 30 wanted to search for local restaurants, the user 30 would typically have to submit search terms that include subject terms such as "restaurant or food or dining, etc.," as well a location term, e.g., "Des Moines." In one illustrative embodiment, shaping service 18 can be implemented to simplify the process by automatically appending terms, such as a zip code or city name to all search strings from the hotel, thus alleviating the need for the user 30 to type in a location. To further enhance the experience, shaping logic 24 could append other such terms. For instance, assume the hotel was a luxury hotel, shaping logic 24 could be configured to append terms such as "luxury" or "5 star" to searches for restaurants, under the assumption that most of its guests are looking for fine dining.

Shaping logic 24 could also use a profiling system 26 to enhance the shaping process. For example, when user 30 logs onto or otherwise accesses network node 11, the user 30 may be asked one or more questions (e.g., How old are you? Is your visit for business or pleasure? Etc.). The answers can be collected and stored in database 28 to form a user profile. Data from users can be collected and tracked over time using known techniques whenever they use network node 11 (e.g., a different question can be asked each time the user reconnects to the network node 11). Based on the collected information, profiling system can form a profile of the user 30, and use the profile to modify data packets, e.g., an inputted query Q, from user 30. Similarly, the Web surfing history, purchasing history, etc., of the user 30 could be collected and stored in database 28 as profile information.

In a further embodiment, shaping service 18 could add terms to the query Q as an advertising service via advertising system 29. For instance, whenever a user 30 from the hotel types "dining," the hotel's restaurant could be added to the original search query Q to ensure that hotel's restaurant appears in the search results. A paid advertising model could likewise be implemented to allow third parties to advertise their services to hotel guests. For instance, assume a local winery wanted to improve their marketing efforts to guests of the hotel. Shaping service 18 could collect a fee to have the name of the local winery added to all searches queries Q that included standard sightseeing terms, such as "activities" "things to do", etc. Thus, advertising system 29 could be utilized to influence how data packets are modified. Any technique could be utilized to generate revenue for the shaping service 18, e.g., a pay per modification, an auction based program, etc.

Depending on the network node application, the user 30 may be put on notice that the network node 11 is implementing a shaping service 18. In some cases, shaping service 18 may be optional for the user 30, e.g., as a means to offset the cost of the wireless service. Thus, if the user 30 did not want their queries modified as described above, they could opt out of a free wireless service option and select a pay per use wireless service option.

In the example depicted in FIG. 1, shaping service 18 alters the query Q as described above and outputs Q'. Then, when the search engine 37 obtains the modified query Q', it processes the query as it would process any other query and returns a set of search results R to the network node 11. Accordingly, performance of search engine 37 is not impacted by the modified query Q'. The search results R are then passed from the network node 11 back to the client 32. As such, the entire process can be seamless to both the user 30 and the search engine 37. An illustrative search string generated by a search engine web page for a query Q may be formatted as follows:

http://www.searchengine.com/search?h1=en&q=hotels.

A modified search string for the modified query Q' may be reformatted as follows:

http://www.searchengine.com/search?h1=en&q=hotels+luxury.

In this case, the modified query Q' has added the term luxury to the original query Q.

Note that while the example described above involves a system for modifying a search query submitted to a search engine 37, it should be understood that shaping service 18 could be used with other web applications 39 to strategically modify any data packets passing through the network node 11 in either direction. Various illustrative applications are outlined below:

1. Search Query Shaping: User 30 performs a search or query through a search engine on the Web 36; shaping service 18 intercepts and modifies the search or query in one or more of the following ways:
   a. adding and/or removing an affiliate id and then forwarding it to its destination
   b. adding and/or removing keywords or content and then forwarding to its destination
   c. redirecting the search or query to an alternative search site or engine
2. Content Shaping: User 30 views a website on the Web 36; shaping service 18 intercepts and modifies the website content or web URL in one or more of the following ways:
   a. inserting hyperlinks on existing non-hyperlinked words or phrases based on keywords detected in the webpage
   b. inserting advertisements or graphics into the webpage based on keywords detected in the webpage
   c. adding and/or removing an affiliate id into the web URL and then forwarding it to its destination d. redirecting the URL to an alternative URL
e. inserting a search bar where the user can perform searches or queries 3. Cookie Shaping: shaping service 18 intercepts a cookie and does one or more of the following:
   a. Modifies the content of the cookie and then sends it on
   b. Reads the cookie and logs the information into a database
   c. Allows the cookie to be sent to the user without modifying it, but reads existing cookies to modify searches, queries or websites as if it were a "keyword" for methods defined in numbers one and two above.
4. XML Shaping: User 30 sends or receives an XML header; shaping service 18 intercepts and does one or more of the following:
   a. Modifies the content of the XML header and then sends it on
   b. Reads the XML header and logs the information into a database
5. Media Shaping: User 30 sends or receives streaming media such as music, video or voice; shaping service 18 intercepts the media and does one or more of the following:
   a. Modifies the content of the streaming media and then sends it on
   b. Reads the streaming media and logs the information into a database Monitoring system 20 and modification system 22 can utilize any technique(s) for identifying data packets and then modifying them. For instance, monitoring system 20 may look for packets that include the name of specific web site, key words, a URL, etc. In one embodiment, monitoring system 20 may monitor URLs embedded in data packets as they are passing through network node 11 and if a matching address is detected in the URL, modification system 22 can shape the data packet by inserting or removing information into the URL. In another embodiment, when a keyword is detected inside a data packet, an anchor tag with its associated URL can be wrapped around the detected keyword forming a hyperlink, and inserted into the data packet.

In some cases, modification system 22 merely adds or replaces text in the packets. In other cases, modifications might include commands or strategies to enhance results. For instance, some search engines might accept logical operators between terms and parenthesis to provide more targeted searches. Thus, if an original query was "Italian restaurants", the modified query might be "((Italian Restaurants) AND (Des Moines)) OR (Bill's Pasta House)." Such a modification may force the search engine 37 to parse the query in a preferred manner.

As noted above, administrative interface 28 provides a mechanism for allowing an administrator 34 to configure the shaping logic 24 (e.g., what data to look for and how to modify it). In one illustrative embodiment, the administrator 34 may interface with network node 11 via a centralized server 36, which could be composed of multiple servers and server locations. In this embodiment, the centralized server 36 acts as the master controller for multiple "participating" network nodes 11 that include a shaping service 18. The centralized server 36 may send customized real time information such as shaping logic 24 to each participating network node 11 via administrative interface 28. Each participating network node 11 can in turn send information back to the centralized server 36, including traffic logs, shaping activities, etc.

Centralized server 36 may also include a database (not shown) to provide redundancy for data stored in database 28. For performance reasons, shaping service 18 may primarily use database 28 to obtain monitoring system triggers such as URLs, keyword sets, location based information such as longitude and latitude, profile information, etc.

Each participating network node 11 may use its IP address, unique DNS name, and/or other unique identifier for identification by centralized server 36. Communication between the network node 11 and the centralized server 36 may be encrypted. Centralized server 36 can generate statistical metrics from collected data and aggregate this information into demographic reports and enhanced profile data.

Figure 2:
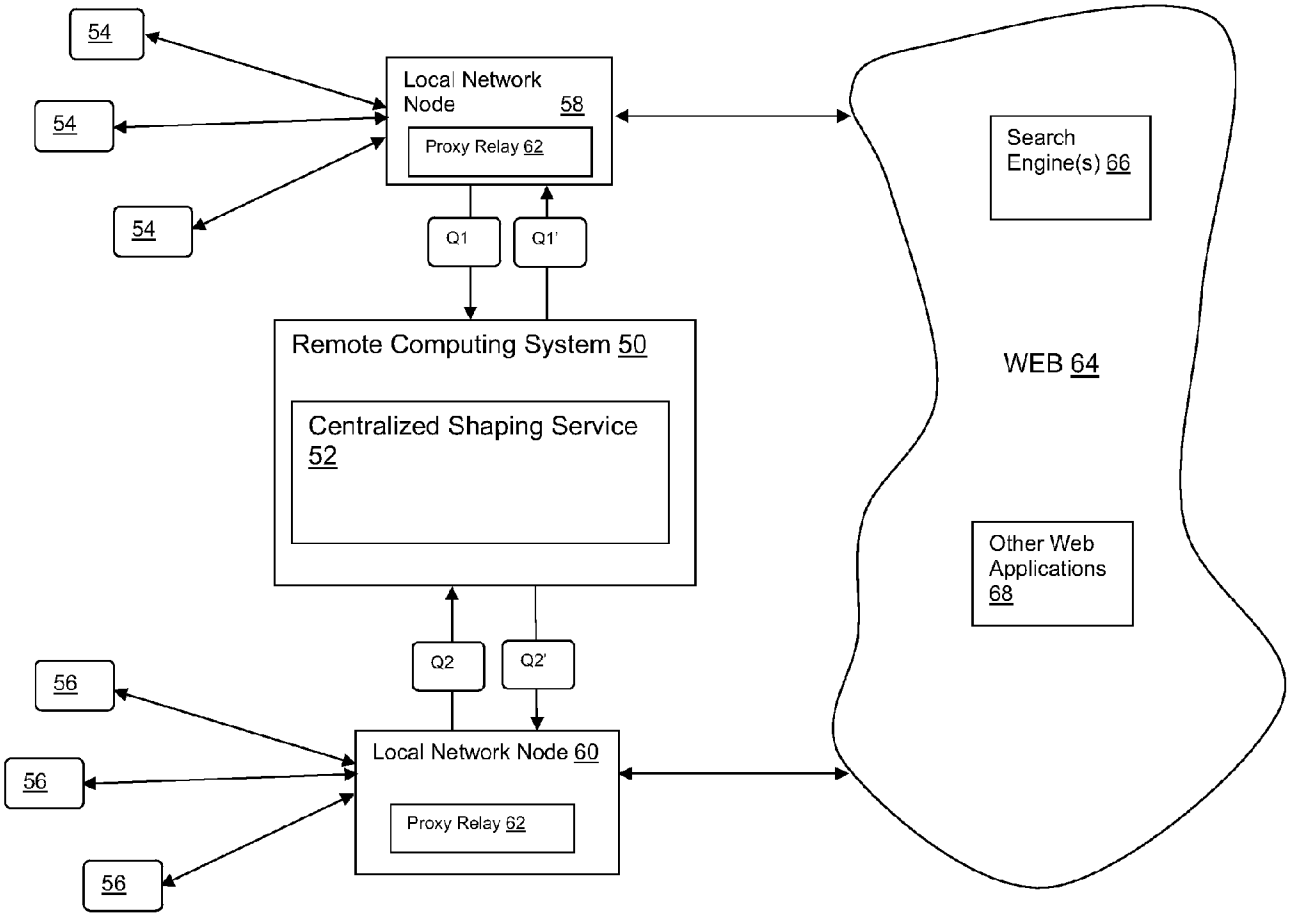
FIG. 2 depicts a networking environment having a centralized shaping service in accordance with an embodiment of the present invention.

Referring now to FIG. 2, an alternative embodiment is provided in which a remote computing system 50 is utilized to provide a centralized shaping service 52 for a plurality of local network nodes 58, 60. In this embodiment, the functions provided by the shaping service 18 described above with regard to FIG. 1 are essentially removed from each participating local network node and are relocated to remote computing system 50. This significantly simplifies the requirements of each local network node 58, 60 and allows the shaping logic to managed and implemented in a centralized location. In this example, local network node 58 is servicing a plurality of clients 54 (e.g., at a first wireless location) and local network node 60 is servicing a plurality of clients 56 (e.g., at a second wireless location). Rather than doing all of the processing described above at a plurality of network nodes, a proxy relay 62 or the like is utilized to route selected data packets to a central location, where a centralized shaping service 52 can implement all of the functionality described above in FIG. 1.

For example, assume a client 54 submits a query Q1 to a search engine 66 at a known URL via local network node 58. The proxy relay 62 would intercept that message (e.g., based on the URL or other criteria) and forward the query Q1 to the centralized shaping service 52 on the remote computing system 50. Centralized shaping service 52 would perform the same functionality as the shaping service 18 described above in FIG. 1. Namely, it would modify the query Q1 and return a modified query Q1', which would then be forwarded to the search engine 66. The search engine 66 would then return the results back the client 54 via local network node 58. Centralized shaping service 52 could thus include shaping logic, a profile system, an advertising system, etc.

The embodiments described herein provide numerous advantages over the current state of the art. For instance, under traditional approaches, if an organization wants to improve there chances of being found on a search engine, they need to pay the search engine. However, Internet providers, wireless providers and cellular companies (ISPs) are allowing users to connect to these search engines as part of an Internet usage fee. As more users continue to use these search services, the greater is the burden being put on the ISP to deliver a fast reliable Internet solution, but they have no way of reaping the financial rewards without raising their rates to the end-user. On the flip side, the more searches a user performs, the more money the Internet search companies make from those that pay to be found on these searches. The described embodiments offer an alternative way for organizations to advertise on these same search engines and web pages while allowing revenue generated from these searches to be shared with the ISPs and users from where the search was initiated. In doing so, the ISPs will be able to increase revenue to support the additional Internet traffic Obtaining information based on demographics and location of users is becoming more important to both the end-users and advertisers. Using IP addresses of the end user is a common way to try and achieve this, but often it is inaccurate, unspecific and unreliable. The described embodiments provide more accurate information because the physical location of the local network node, and thus the end-user, is known. Using the shaping services described herein, the street address and/or the latitudinal and longitudinal coordinates of user locations are known, thus enabling a service that can provide more accurate demographic and geographic when modifying data packets for Web applications.

Furthermore, as noted above, the embodiments described herein improve search results using profile information. For example, consider a user whose profile indicates an interest in gems and jewelry that is in New York City at a convention. The user could access a participating network node and simply type "stores" in a search engine. The search could be augmented with words like "gems and jewelry" and return stores in New York City that are either a gem store or a jewelry store. Merchants that advertise using the advertising system described herein would have traffic driven to them and thus provide a win-win situation for both the user and the merchant because they both obtain enhanced results. The profile helps control and guide the user through their searches and assists them in tailoring the search results to just what they are looking for. Buying trends and previous search patterns would be used to enhance the user's profile by adding common keywords to their profile chosen by the user during their searches. Buying habits could also be monitored by storing a unique item descriptor such as a UPC, or manufacturer part number, etc., of items they buy through a participating network node. Categorization of the type of products, services, or events users purchase or search for could likewise be added to user profiles.

Another application involves cell phone usage. Many cell phones have limited key entry and require multi-tapping in order to spell words as their search pattern. Some phones augmented with T9 have a built in dictionary lookup that reduces the number of keystrokes but still require the user to fully declare the keywords prior to searching. By allowing the user to store their own personal keyword shortcut (e.g., as part of their profile), this would significantly reduce the amount of key strokes needed to create the keyword desired for their search. For example, assume a user wanted to find the closest McDonalds Restaurant. The user could register the keystroke 6-3 and map it to the word "McDonalds". So once the search engine is opened the user could simply type in the number 6, the number 3, and enter. The shaping service would recognize those keystroke patterns and replace them with the word "McDonalds" and then perform a search and return McDonald locations nearest to them. Location of the user could be determined by either cell phone tower triangulation, network access ID, or by GPS tracking.

Referring again to FIG. 1, shaping service 18 may be embodied on any type of computing system 10. Computing system 10 (as well as centralized computing system 50 in FIG. 2) generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computing system 10 and likewise may comprise any known type of transmission link, including electrical, optical, wireless, etc. Although not shown, additional components, such as cache memory, communication systems, system software, etc., may be incorporated into computer system 10.

Access to computing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, computing systems 10 and 50 comprising a shaping service could be created, maintained and/or deployed by a service provider that offers the functions described herein for customers. That is, a service provider could offer to deploy or provide the ability to shape data packets as described above.

It is understood that in addition to being implemented as a system and method, the features may be provided as a program product stored on a computer-readable medium, which when executed, enables computing system 10 to provide a shaping service. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for enhancing searches, comprising, a processor and memory;

an administrative interface for configuring a shaping logic, wherein the shaping logic includes a set of key words and an associated modification action to be taken for each key word in the set of key words;

a system for monitoring data packets passing through a network node to different websites on the web, wherein the system for monitoring examines data packets to identify only search-related data packets that include an original search query being directed to a general purpose search engine website;

a system for selectively modifying a search-related data packet when a key word is detected in the original search query to create a modified search query based on the associated modification action, *wherein the associated modification action is independent of an identity of a user responsible for the original search query, and* wherein the search-related data packet is modified at the network node before being forwarded to, and independent of, the general purpose search engine website; and a system for forwarding the search-related data packet containing the modified search query to *at least one of an alternative search engine or* the general purpose search engine website in place of the original search query.

2. The system of claim 1, wherein the system for monitoring determines if the data packet contains a predetermined uniform resource locator (URL).

3. The system of claim 1, wherein the system for monitoring determines if the data packet contains a key word.

4. The system of claim 1, wherein the network node is a router.

5. The system of claim 1, wherein the network node is selected from the group consisting of a firewall and proxy server.

6. The system of claim 1, wherein the modified search query includes an appended term relative to the original search query.

7. The system of claim 1, wherein the modified search query includes a removed term relative to the original search query.

8. The system of claim 1, wherein the system for modifying the data packet resides at the network node.

[9. The system of claim 1, wherein the system for modifying the data packet modifies search queries for data packets bound for anyone of a plurality of different general purpose search engines.]

10. The system of claim 1, further comprising a system for notifying a user that search querying activities are being modified and allowing the user to opt out.

11. The system of claim 1, further comprising an advertising system that allows an advertiser to add an advertiser-selected term to the original search query.

12. A method for enhancing searches being performed by a search engine application, comprising[.]*:* providing an interface for configuring a shaping logic using a [computer] *computing* device, wherein the shaping logic includes a set of key words and an associated modification action to be taken for each key word in the set of key words;

monitoring data packets passing through a network node to different websites on the web, wherein the system for monitoring examines data packets to identify only search-related data packets that include an original search query being directed to a general purpose search engine website;

modifying the search-related data packet using the computing device when a key word is detected in the original search query to create a modified search query based on the associated modification action, *wherein the associated modification action is independent of an identity of a user responsible for the original search query, and* wherein the search-related data packet is modified before being forwarded to the general purpose search engine website; and forwarding the search-related data packet containing the modified search query to *at least one of an alternative search engine or* the general purpose search engine website in place of the original search query.

13. The method of claim 12, wherein the monitoring determines if the data packet contains a predetermined uniform resource locator (URL) or if the data packet contains a key word.

14. The method of claim 12, wherein network node is selected from the group consisting of a router, firewall and proxy server.

15. The method of claim 12, wherein the modified search query includes an appended or removed term relative to the original search query.

16. The method of claim 12, wherein the modifying of the data packet occurs at the network node.

17. The method of claim 12, wherein the modifying of the data packet occurs at a remote node away from the network node, and wherein the remote node processes and modifies search queries for data packets bound for a plurality of different general purpose search engines.

18. The method of claim 12, further comprising notifying a user that search querying activities are being modified, and allowing the user to opt out.

19. The method of claim 12, wherein the modifying of the data packet is influenced by an advertiser by allowing the advertiser to add an advertiser-selected term to the original search query.

20. A program product stored on a non-transitory computer readable storage medium, which when executed, causes a computer system to enhance a result of a web application, the program product comprising:

program code for monitoring data packets passing through a network node to different websites on the web, wherein the monitoring examines data packets to specifically identify search-related data packets that include an original search query being directed to a general purpose search engine website;

program code for selectively modifying a search-related data packet to create a modified data packet based on a predetermined modification action, *wherein the predetermined modification action is independent of an identity of a user responsible for the original search query, and* wherein the search-related data packet is modified before being forwarded to, and independent of, the general purpose search engine website; and program code for forwarding the modified data packet to *at least one of an alternative search engine or* the general purpose search engine website in place of the search-related data packet to effectuate an enhanced result from the web application.

21. The program product of claim 20, wherein the modified data packet includes a modified hyperlink.

22. The program product of claim 20, wherein the program code for modifying the search-related data packet includes program code for analyzing a profile of a user.

23. The program product of claim 20, wherein the program code for modifying the search-related data packet is influenced by an advertising process.

24. The program product of claim 20, wherein the program code for modifying the search-related data packet is executed at a remote computing system apart from the network node.

* * * * *